(12) United States Patent
Fry et al.

(10) Patent No.: US 6,576,146 B2
(45) Date of Patent: Jun. 10, 2003

(54) FILTRATION ELEMENT EMPLOYING IMPROVED BACKWASH FEATURE AND METHOD OF UTILIZING SAME

(75) Inventors: Darrel D. Fry, Nowata, OK (US); Steven P. Franke, Nowata, OK (US); William B. Frauenberger, Nowata, OK (US)

(73) Assignee: NMW, Incorporated, Nowata, OK (US)

( * ) Notice: Subject to any disclaimer, the term of this patent is extended or adjusted under 35 U.S.C. 154(b) by 0 days.

(21) Appl. No.: 09/972,354

(22) Filed: Oct. 5, 2001

(65) Prior Publication Data

US 2003/0066795 A1 Apr. 10, 2003

(51) Int. Cl.⁷ .......................... B01D 29/62; B01D 29/66
(52) U.S. Cl. ................... 210/791; 210/798; 210/323.2; 210/333.01; 210/411; 55/341.1; 55/379; 366/336; 366/340
(58) Field of Search .......................... 210/333.01, 767, 210/323.2, 232, 411, 791, 798; 55/341.1, 379; 366/340, 336

(56) References Cited

U.S. PATENT DOCUMENTS

| | | |
|---|---|---|
| 2,423,172 A | 7/1947 | Booth |
| 2,454,124 A | 11/1948 | Birsch et al. |
| 2,684,942 A | 7/1954 | Tice |
| 2,731,107 A | 1/1956 | Hersey, Jr. |
| 2,742,157 A | 4/1956 | Brunton |
| 2,985,306 A | 5/1961 | Statzell |
| 3,169,109 A | * 2/1965 | Hirs |
| 3,176,846 A | 4/1965 | Adams |
| 3,193,100 A | 7/1965 | Broughton |
| 3,256,678 A | 6/1966 | Bertin et al. |
| 3,387,712 A | 6/1968 | Schrink |
| 3,649,754 A | 3/1972 | Sephton |
| 3,692,178 A | 9/1972 | Reece |
| 3,703,465 A | 11/1972 | Reece et al. |
| 3,945,923 A | 3/1976 | Rogers et al. |
| 3,976,577 A | 8/1976 | Kaiser |
| 3,980,560 A | 9/1976 | Eades |
| 4,059,518 A | 11/1977 | Rishel |
| 4,192,750 A | 3/1980 | Elfes et al. |
| 4,267,039 A | * 5/1981 | Ryan |
| 4,302,424 A | 11/1981 | Miyake et al. |
| 4,347,136 A | 8/1982 | Friesen et al. |
| 4,642,188 A | 2/1987 | DeVisser et al. |
| 4,664,798 A | 5/1987 | Bergh |
| 4,713,174 A | 12/1987 | Zievers |
| 4,725,356 A | 2/1988 | Zievers et al. |
| 4,769,136 A | 9/1988 | McCormick et al. |
| 4,836,922 A | 6/1989 | Rishel et al. |
| 4,944,875 A | 7/1990 | Gaignet |
| 4,946,588 A | 8/1990 | Wise |
| 5,028,323 A | 7/1991 | Gould |
| 5,084,176 A | 1/1992 | Davis et al. |
| 5,089,131 A | 2/1992 | Gentry |
| 5,198,111 A | 3/1993 | Davis |
| 5,209,844 A | 5/1993 | Zievers et al. |
| 5,279,733 A | 1/1994 | Heymans |
| 5,445,738 A | 8/1995 | Fry et al. |
| 5,484,528 A | 1/1996 | Yagi et al. |
| 5,766,467 A | * 6/1998 | Rech et al. |
| 5,785,870 A | 7/1998 | Davis et al. |
| 5,792,373 A | 8/1998 | Bennick et al. |
| 5,972,228 A | * 10/1999 | Ingelman |

* cited by examiner

Primary Examiner—Thomas M. Lithgow
(74) Attorney, Agent, or Firm—Stinson Morrison Hecker LLP; J. David Wharton

(57) ABSTRACT

A diffuser rod for use in a filter stalk having deflector disks rigidly mounted thereon to deflect liquid radially during the backwash process is disclosed. A backwashable filter element containing a diffuser plate that is located within the filter member at the end where the backwash fluid enters the filter member and a number of filter stalks with each filter stalk including a diffuser rod is disclosed. Finally, a method of backwashing a filter member that includes the step of introducing a diffuser rod and a diffuser plate to the filter assembly is disclosed.

30 Claims, 2 Drawing Sheets

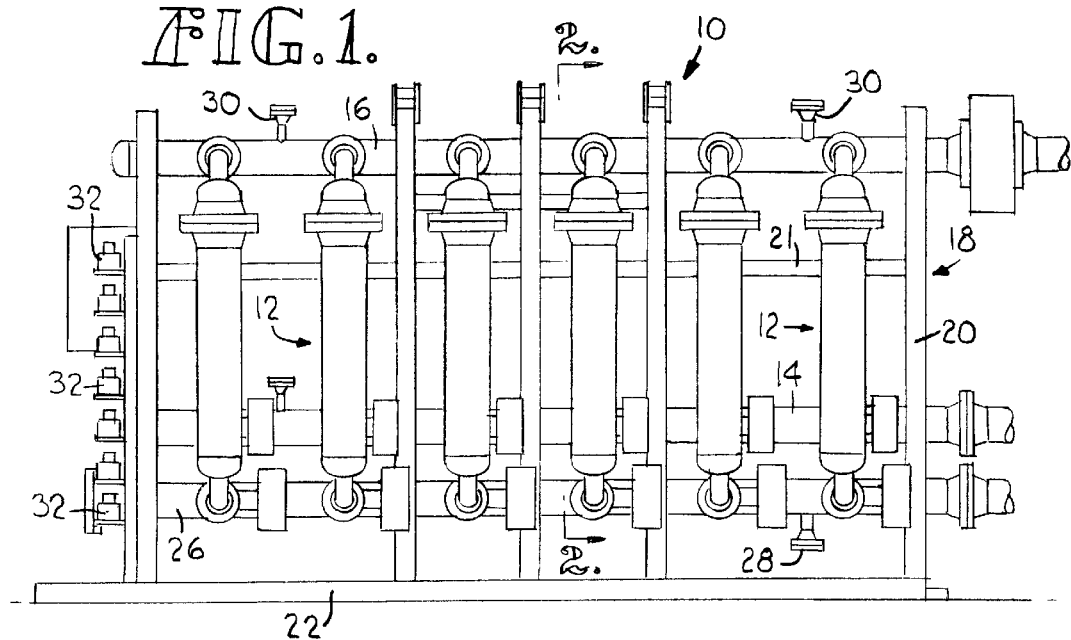
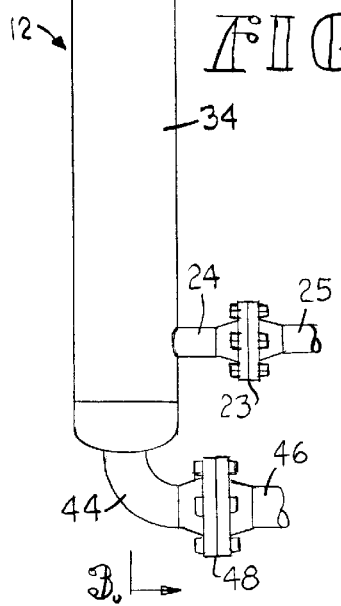
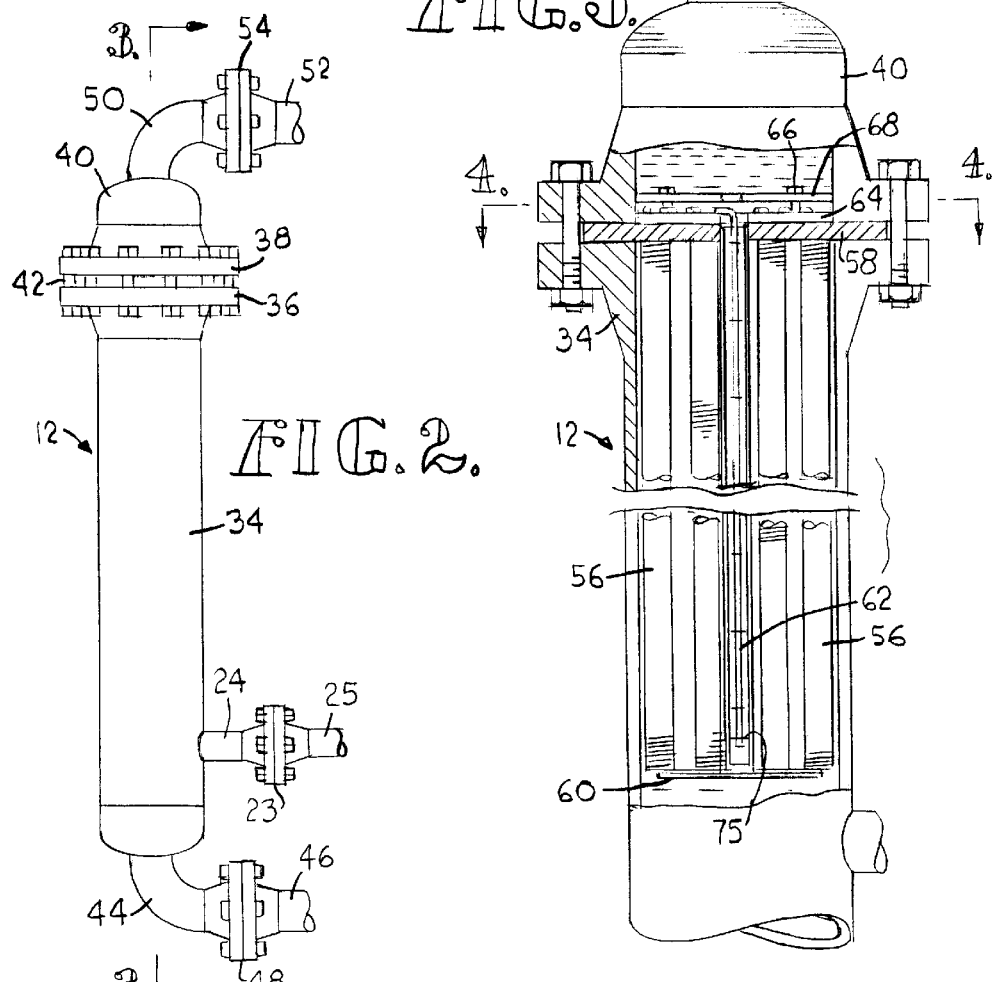

FILTRATION ELEMENT EMPLOYING IMPROVED BACKWASH FEATURE AND METHOD OF UTILIZING SAME

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to a filter system, and more specifically, to a backwashable filter system of the type utilized in petroleum refining applications.

Filter assemblies employing an array of individual filter stalks have long been utilized. Unfiltered fluid enters the filter assembly, passes through one of the slotted or perforated filter stalks arranged within the filter assembly, and exits the filter assembly as a filtered fluid. Solid contaminants are retained on the outer surface of the filter stalks as the fluid passes through the stalks. As more contaminants are retained against the filter stalks, the differential pressure across the filter medium increases and consequentially the flow decreases.

One method of cleaning filter stalks is a process known as backwashing. During backwashing, a cleaning fluid is forced through the filter assembly in a direction opposite to the normal operating flow. Backwashing alone, however, is of limited effectiveness. Even when a large amount of backwash fluid or an extended period of time are used, simple backwashing may clean only a portion of the filter stalks effectively.

To address this drawback, devices to supplement and enhance the backwashing process have been introduced. One such device is disclosed in U.S. Pat. No. 3,387,712, issued to Schrink. This patent discloses a backwash water diffuser for use within a filter stalk. The diffuser is made up of a shaft that extends the length of the filter stalk and that has a number of diffuser lugs mounted thereon. The diffuser lugs have an annular frusto-conical surface which faces the direction that the backwash fluid enters the filter, and, at least in one embodiment, are located within the seventy percent of the filter stalk adjacent to the backwash water inlet.

The present applicants have found that a rod which is mounted within a filter stalk and which has deflector disks that have a surface perpendicular to the rod and that are spaced along the rod enhances the backwashing action and, therefore, enhances cleaning of the filter stalk. The increased backwashing action results from the diversionary effect of the deflector disks and better distribution of the backwash fluid up and down the stalk. The result is improved removal of contaminants. In addition, applicants have found that the efficiency of the backwash process is enhanced when a diffuser plate that has apertures for the passage of fluid is mounted above the individual filter stalks.

Accordingly, it is the object of this invention to provide a diffuser rod with deflector disks rigidly mounted on said rod for use in a filter stalk to deflect liquid radially during the backwash process.

It is a further object of this invention to provide a backwashable filter assembly containing a number of filter stalks with each filter stalk including a diffuser rod as described above.

It is a further object of this invention to provide a backwashable filter assembly containing a diffuser plate that is located within the filter assembly at the end where the backwash liquid enters the filter assembly and is spaced from the filter stalks and that has a number of apertures corresponding to the number of filter stalks present within the filter assembly.

Finally, it is a further object of this invention to provide a method of backwashing a filter assembly that includes the step of introducing a diffuser rod and a diffuser plate to the filter assembly.

Further objects of this invention will be apparent to persons knowledgeable with devices of this general type upon reading the following description and examining the accompanying drawings.

SUMMARY OF THE INVENTION

A diffuser rod for use in a filter stalk, said rod having deflector disks rigidly mounted thereon to deflect liquid radially during the backwash process, is disclosed. A backwashable filter assembly containing a diffuser plate that is located within the filter assembly at the end where the backwash fluid enters the filter assembly and a number of filter stalks with each filter stalk including a diffuser rod is disclosed. Finally, a method of backwashing a filter assembly that includes the step of introducing a diffuser rod and a diffuser plate to the filter assembly is disclosed.

BRIEF DESCRIPTION OF THE DRAWINGS

In the accompanying drawings, which form a part of the specification and are to be read in conjunction therewith, and in which like reference numerals are used to indicate the parts in the various views:

FIG. 1 is a side elevation view of a filter array;

FIG. 2 is a view of one of the filter assemblies taken along line 2—2 of FIG. 1;

FIG. 3 is an enlarged vertical cross sectional view of the filter assembly of FIG. 2 taken along line 3—3 of FIG. 2;

DETAILED DESCRIPTION OF THE INVENTION

Figure 4:
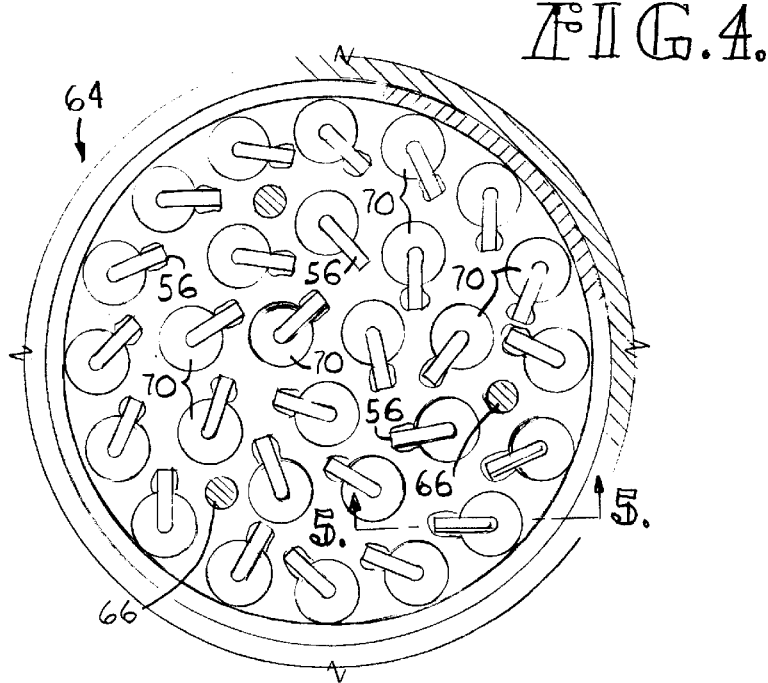
FIG. 4 is a horizontal cross sectional view taken along line 4—4 of FIG. 3.

Referring initially to FIG. 1, a filter array is designated generally by the numeral 10 and comprises a plurality of filter assemblies 12 which are mounted vertically in two parallel rows (one of which is visible in FIG. 1) between an outlet header line 16 located at the top end of the filter assemblies 12 and an inlet line 14 located substantially at the opposite end of the filter assemblies 12. It is to be understood that header line 16 also serves as the backwash inlet line and thus serves multiple functions. The entire assembly is mounted on a framework designated generally by the numeral 18. Framework 18 includes parallel vertical supports 20, horizontal supports 21 and a bottom platform 22. A backwash drain line 26 is also supported by framework 18. The backwash drain line 26, outlet header line 16 and inlet line 14 are in fluid communication with each of the filter assemblies 12. A flush drain 28 extends from one end of the backwash drain line 26. A plurality of purge inlets 30 extend from the outlet header line 16. A plurality of controllers 32, corresponding to the number of filter assemblies 12, are mounted at one end of framework 18.

Referring now to FIG. 2 and details of construction of the filter assemblies 12, all of which are identical, each assembly 12 comprises a cylindrical housing 34 that terminates at its uppermost end in a flange 36 which is aligned with a corresponding flange 38 on a generally bell-shaped header 40. Flanges 36 and 38 are held in alignment by a number of nut and bolt assemblies 42. The bottom of cylinder 34 has an opening which receives an elbow 44 which is coupled with a backwash drain link 46 by means of a flanged coupling 48. The backwash drain link 46 is in turn coupled with the backwash drain line 26. The cylinder 34 has an opening near the bottom that receives an inlet branch 24 which is coupled to an inlet link 25 by means of a flange coupling 23. The inlet link 25 is in turn coupled to the inlet line 14. The header 40 receives an elbow 50 which is coupled with a link 52 by means of a flange coupling 54. The link 52 is in turn coupled with the outlet header line 16. It is to be understood that appropriate valving (not shown) well known to those skilled in the art is utilized to control the flow of fluid through the inlet and outlet headers as well as the backwash drain line.

A number of individual filter stalks 56 are disposed within the filter assemblies 12, as shown in FIG. 3. One end of each filter stalk 56 is fixedly attached to an assembly flange 58 which is sandwiched between the cylinder 34 and header 40. The opposite end of the filter stalk 56 is supported by a support plate 60. A diffuser rod 62 is disposed within each filter stalk 56. One end of the diffuser rod 62 extends beyond the filter stalk 56 and the assembly flange 58 and is fixedly attached to an assembly plate 64. Plate 64 is located at the open end of header 40. The assembly plate 64 is held in alignment with the assembly flange 58 by nut and bolt assemblies 66 (see FIG. 4). A diffuser plate 68 is mounted above the assembly plate 64.

As can be seen in FIG. 4, the assembly plate 64 contains a number of apertures 70 which correspond to the number of filter stalks 56 within cylinder 34. One end of diffuser rod 62 extends through the apertures 70 and is fixedly attached to the assembly plate 64. The assembly plate 64 also contains openings for the nut and bolt assemblies 66 that attach it to the assembly flange 58.

Figure 5:
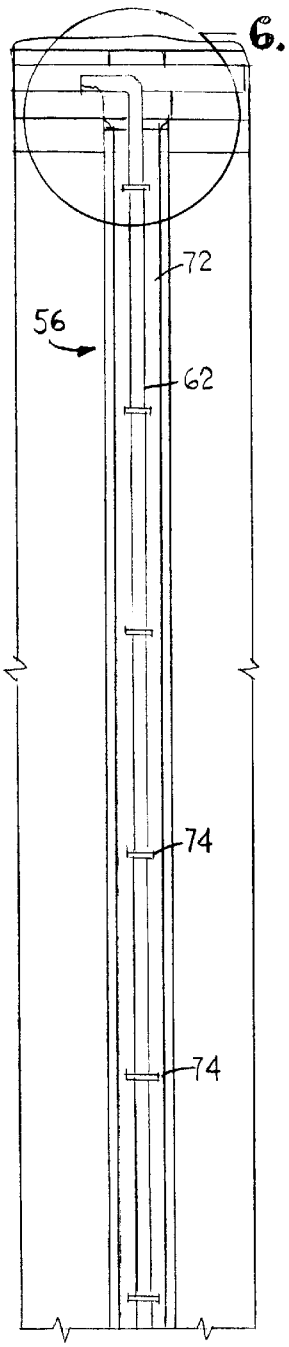
FIG. 5 is a an enlarged vertical cross sectional view taken along line 5—5 of FIG. 4.
Figure 6:
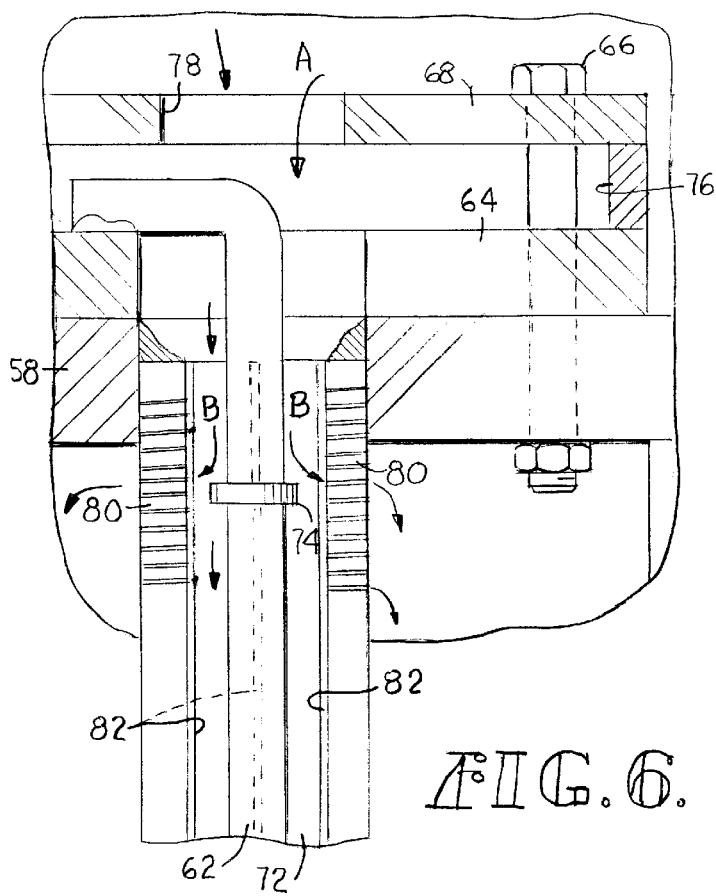
FIG. 6 is an enlarged cross sectional view of the portion of FIG. 5 encompassed by the circle 6.

Referring now to FIG. 5 and FIG. 6 and details of the filter stalk 56 and diffuser rod 62, all of which are identical, each filter stalk 56 is comprised of a filter media 80 fixedly attached to a number of media supports 82. The media supports 82 extend the length of the filter stalk 56. The filter media 80 contains a plurality of slots or perforations through which fluid may pass but which will retain solids of a predetermined size or larger. The filter media 80 is formed such that the filter stalk 56 is cylindrical with a central open area 72. A diffuser rod 62 is positioned substantially within the central open area 72 of the filter stalk 56. A number of deflector disks 74 are fixedly attached to the rod 62 in spaced relation so that the surfaces of the deflector disks 74 are perpendicular to the rod 62. The final deflector disk nearest to the support plate 60 is a centering disk 75 that has a diameter substantially corresponding to the diameter of the central open area 72 of the filter stalk 56 so that the diffuser rod 62 is prevented from moving radially (see FIG. 3).

With further reference to FIG. 6, a diffuser plate 68 is mounted above the assembly plate 64 and spaced apart from the assembly plate 64 by a ring 76 which is coupled to the diffuser plate 68. The diffuser plate 68 contains a number of apertures 78 corresponding to the number of individual filter stalks 56 within cylinder 34. The diffuser plate 68, assembly plate 64 and assembly flange 58 are aligned so that apertures within each correspond.

The effectiveness of a specific diffuser rod in cleaning a particular filter stalk during a backwash cycle depends on certain dimensions of the filter stalk and diffuser rod. These dimensions may be derived from the formula below for filter stalks with an outside diameter ranging from 0.75 inches to 3 inches.

For a filter stalk with a central open area diameter of ID, the following formula provides a design constant, $C_D$:

$$C_D = 1.2 \cdot (ID/0.888)^2$$

which may be used in the following formula to determine the measurements of an effective diffuser rod for that filter stalk:

$$C_D = \ln(((DD/ID)^2 \cdot 100)/(ST \cdot SP))$$

where DD is the diameter of the deflector disks, ST is the distance between the first deflector disk and the bottom of flange 58, SP is the distance between each deflector disk, and ID, as stated above, is the diameter of the central open area of the filter stalk. SP, ST, and DD, may be derived from this equation, that is, SP may be derived for specific values of DD and ST, DD may be derived for specific values of ST and SP, and ST may be derived for specific values of DD and SP. For example, with these equations it is possible to determine the most efficient spacing for deflector disks of a specific diameter for use on a diffuser rod in a filter stalk with a known central open area diameter for various distances between the first deflector disk and the top of the filter stalk.

In operation, unfiltered product is introduced to the filter array 10 through the inlet header line 14. The unfiltered product flows from the inlet header line 14 through the inlet link 25, the inlet branch 24, and into the filter assembly 12. The only exit available for the product is through the elbow 50 attached to the header 40 which leads to the outlet header line 16. In order to reach this exit, the product passes through the filter media 80 of the filter stalk 56 and through the apertures in the assembly flange 58, the assembly plate 64 and diffuser plate 68. As the product passes through the filter media 80, all solid contaminants larger than a predetermined size are trapped outside and retained against the filter media 80.

As more contaminants are retained against the filter stalks, the flow decreases. In order to clean the filter stalks 56, backwash fluid is introduced to a particular assembly from backwash inlet line 16. The backwash fluid flows through the link 52 coupled to the line 16 and into the elbow 50 attached to the assembly header 40 of the filter assembly 12. As shown by arrow A in FIG. 6, the backwash fluid thereafter flows through the apertures 78 in the diffuser plate 68. The apertures 78 in the diffuser plate 68 are relatively smaller than the apertures 70 in the assembly plate 64 so that a pressure differential is developed which evenly distributes the backwash fluid among the individual filter stalks 56 disposed within the filter assembly 12. The backwash fluid then passes through the apertures 70 in the assembly plate 64 into the filter stalk 56. Once in the filter stalk 56, the backwash fluid encounters the deflector disks 74 and, as shown by arrow B in FIG. 6, a portion of the backwash fluid is deflected radially to the walls of filter stalk 56 where it carries away any solid contaminants adhering to those walls. After flowing the length of the filter assembly 12, the backwash fluid drains through the elbow 44 attached to the bottom of the filter assembly 12 and through the backwash header link 46 into the backwash header drain 26 carrying the solid contaminants out of the filter assembly 12.

The diffuser rod 62 described above and shown in the accompanying drawings causes the backwash fluid to deflect radially against the filter media 80 of the filter stalk 56. The deflection of the backwash fluid causes the backwash cycle to be more efficient. The diffuser plate 68 described above causes the backwash fluid to distribute evenly among the filter stalks 56 arrayed within a filter assembly 12. By causing an even distribution of the backwash fluid, the diffuser plate 68 also causes the backwash cycle to be more efficient. The increased efficiency of the backwash cycle results in decreased time for backwashing as well as increased time between backwashing and, therefore, decreases the time the filter assembly 12 is out of service. It also reduces the quantity of backwash fluid utilized which means less process fluid lost to the backwash process.

It will be seen from the foregoing that this invention is one well adapted to attain the ends and objects set forth above, and to attain other advantages which are obvious and inherent in the device. It will be understood that certain features and subcombinations are of utility and may be employed without reference to other features and subcombinations. This is contemplated by and within the scope of the claims. It will be appreciated by persons skilled in the art that the present invention is not limited to what has been particularly shown and described hereinabove. Rather, all matter shown in the accompanying drawings or described hereinabove is to be interpreted as illustrative and not limiting.

What we claim is:

1. A device for use in a filter stalk, said filter stalk being disposed in spaced relationship among a plurality of filter stalks within the housing of a filter assembly adapted to be backwashed to cleanse said filter stalks, said filter stalk having a central open area, said device comprising:
    a rod positioned within said central open area of said filter stalk and extending substantially the length of said stalk; and
    a plurality of deflector disks rigidly mounted on said rod in spaced apart relationship, wherein each of said plurality of deflector disks is sized such that fluid can flow between each of said plurality of deflector disks and said filter stalk;
    whereby fluid passing through said filter stalks during backwashing is deflected radially.

2. A device as set forth in claim 1, wherein said rod is positioned substantially in the center of said filter stalk.

3. A device as set forth in claim 1, wherein said rod extends the entire length of said filter stalk.

4. A device as set forth in claim 1, wherein the distance between said deflector disks is substantially equal.

5. A device as set forth in claim 1, wherein said deflector disks have an increasing diameter as they are spaced along the path of the backwash fluid.

6. A device as set forth in claim 1, wherein is included a centering disk rigidly mounted at the end of said rod opposite from the backwash fluid entry of said filter assembly, said centering disk having a diameter substantially corresponding to the diameter of the central open area of said filter stalk.

7. A device as set forth in claim 6, wherein the distance between said centering disk and the deflector disk adjacent to said centering disk is less than the distance between other deflector disks.

8. A device as set forth in claim 1, wherein each of said deflector disks has one of two distinct diameters.

9. A device as set forth in claim 8, wherein said deflector disks with the smaller diameter are located on said rod nearest the backwash fluid entry of said filter assembly.

10. A device as set forth in claim 8, wherein is included a centering disk rigidly mounted at the end of said rod opposite from the backwash fluid entry of said filter assembly, said centering disk having a diameter substantially corresponding to the diameter of the central open area of said filter stalk, said diameter of said centering disk being larger than the diameters of said deflector disks.

11. A filter assembly for filtering contaminants from fluid, said filter assembly comprising:
    a filter housing;
    an assembly flange, said assembly flange being configured to correspond to the configuration of said housing and having a plurality of apertures for the passage of fluid;
    a plurality of filter stalks, each of said stalks fixedly attached to said assembly flange at said apertures wherein fluid can pass through said assembly flange and into said filter stalk, each of said filter stalks having a central open area, and each of said Filter stalks containing a rod positioned within said central open area of said filter stalk and extending substantially the length of said stalk and a plurality of deflector disks rigidly mounted on said rod in spaced apart relationship, wherein each of said plurality of deflector disks is sized such that fluid can flow between each of said plurality of deflector disks and said filter stalk, whereby fluid passing through said filter stalks during backwashing is deflected radially; and
    means for receiving backwashing fluid to cleanse said filter stalks.

12. A filter assembly as set forth in claim 11, wherein the diameter of the apertures in the assembly flange corresponds to the diameter of the filter stalks.

13. A filter assembly as set forth in claim 11, wherein the number of apertures in the assembly flange is equal to the number of filter stalks.

14. A filter assembly as set forth in claim 11, wherein said rod is positioned substantially in the center of said filter stalk.

15. A filter assembly as set forth in claim 11, wherein said rod extends the entire length of said filter stalks.

16. A filter assembly as set forth in claim 11, wherein the distance between said deflector disks is substantially equal.

17. A filter assembly as set forth in claim 11, wherein said deflector disks have an increasing diameter as they are spaced along the path of the backwash fluid.

18. A filter assembly as set forth in claim 11, wherein is included a centering disk rigidly mounted at the end of said rod opposite from the backwash fluid entry of said filter assembly, said centering disk having a diameter substantially corresponding to the diameter of the central open area of said filter stalk.

19. A filter assembly as set forth in claim 18, wherein the distance between said centering disk and the deflector disk adjacent to said centering disk is less than the distance between other deflector disks.

20. A filter assembly as set forth in claim 11, wherein each of said deflector disks has one of two distinct diameters.

21. A filter assembly as set forth in claim 20, wherein said deflector disks with the smaller diameter are located on said rod nearest the backwash fluid entry of said filter assembly.

22. A filter assembly as set forth in claim 20, wherein is included a centering disk rigidly mounted at the end of said rod opposite from the backwash fluid entry of said filter assembly, said centering disk having a diameter substantially corresponding to the diameter of the central open area of said filter stalk, said diameter of said centering disk being larger than the diameters of said deflector disks.

23. A filter assembly as set forth in claim 11, further comprising an assembly plate, said assembly plate being configured to correspond to the configuration of said housing and having a plurality of apertures for the passage of fluid wherein said rods extend through said assembly plate and are attached thereto.

24. A filter assembly as set forth in claim 23, wherein the diameters of said apertures in said assembly plate correspond to the diameter of the filter stalks.

25. A filter assembly as set forth in claim 23, wherein the number of apertures in the assembly plate is equal to the number of filter stalks.

26. A filter assembly as set forth in claim 11, further comprising a diffuser plate located within said filter assembly at the end where backwash fluid enters said filter assembly, said diffuser plate being spaced from said filter stalks, said diffuser plate being configured to correspond to the configuration of said housing and having a plurality of apertures for the passage of fluid.

27. A filter assembly as set forth in claim 26, wherein the diameter of said apertures in said diffuser plate is less than the diameter of the filter stalks.

28. A filter assembly as set forth in claim 26, wherein the number of apertures in said diffuser plate is equal to the number of filter stalks.

29. A filter assembly as set forth in claim 26, wherein said rods extend through said diffuser plate and are attached thereto.

30. A method of cleaning a filter stalk, said filter stalk being disposed in spaced relationship among a plurality of filter stalks within the housing of a filter assembly adapted to be backwashed to cleanse said filter stalks, said filter stalk having a central open area, said method comprising the following steps:

placing a diffuser rod in the central open area of said filter stalk, said diffuser rod having a plurality of deflector disks rigidly mounted on said rod in spaced apart relationship, wherein each of said plurality of deflector disks is sized such that fluid can flow between each of said plurality of deflector disks and said filter stalk; and introducing backwash fluid to said filter stalk whereby said backwash fluid enters the central open area of said filter stalk and passes through the length of the filter stalk.

\* \* \* \* \*

UNITED STATES PATENT AND TRADEMARK OFFICE
CERTIFICATE OF CORRECTION

PATENT NO.   : 6,576,146 B2  
DATED        : June 10, 2003  
INVENTOR(S)  : Darrel D. Fry, Steven P. Franke and William B. Frauenberger Page 1 of 1

It is certified that error appears in the above-identified patent and that said Letters Patent is hereby corrected as shown below:

<u>Column 8,</u>  
Line 21, insert the following claims:
  31. A method as set forth in claim 30, further comprising the step of fixedly attaching said diffuser rod to an assembly plate.
  32. A method as set forth in claim 30, further comprising the step of positioning a diffuser plate spaced above said filter stalks following the step of placing said diffuser rods and before the step of introducing said backwash fluid to said filter stalk.
  33. A method as set forth in claim 32, further comprising the step of fixedly attaching said diffuser rod to said diffuser plate.

Signed and Sealed this

Ninth Day of December, 2003

JAMES E. ROGAN  
*Director of the United States Patent and Trademark Office*